(12) United States Patent
Rifkin

(10) Patent No.: US 7,257,556 B1
(45) Date of Patent: Aug. 14, 2007

(54) METHOD AND SYSTEM FOR PROVIDING MANDATORILY CONVERTIBLE SECURITIES WITH ASSOCIATED SENIOR DEBT INSTRUMENTS

(75) Inventor: Alan Rifkin, New York, NY (US)

(73) Assignee: Citigroup Global Markets, Inc., New York, NY (US)

( * ) Notice: Subject to any disclaimer, the term of this patent is extended or adjusted under 35 U.S.C. 154(b) by 42 days.

(21) Appl. No.: 10/830,308

(22) Filed: Apr. 23, 2004

Related U.S. Application Data

(60) Provisional application No. 60/464,974, filed on Apr. 24, 2003.

(51) Int. Cl.
*G06Q 40/00* (2006.01)

(52) U.S. Cl. .................... 705/36 R; 705/35

(58) Field of Classification Search ........... 705/35–37
See application file for complete search history.

(56) References Cited

U.S. PATENT DOCUMENTS

| | | | |
|---|---|---|---|
| 4,752,877 A | | 6/1988 | Roberts et al. |
| 2001/0029476 A1 | | 10/2001 | Mallenbaum |
| 2003/0093375 A1 | * | 5/2003 | Green et al. ............ 705/40 |
| 2003/0135446 A1 | * | 7/2003 | Birle et al. ............. 705/37 |
| 2003/0163400 A1 | * | 8/2003 | Ross et al. ............. 705/35 |
| 2004/0064391 A1 | | 4/2004 | Lange |
| 2004/0098327 A1 | * | 5/2004 | Seaman .................. 705/36 |
| 2004/0133494 A1 | | 7/2004 | Jones et al. |
| 2004/0153388 A1 | | 8/2004 | Fisher et al. |
| 2004/0177022 A1 | | 9/2004 | Williams et al. |
| 2004/0193536 A1 | * | 9/2004 | Marlowe-Noren .......... 705/39 |
| 2005/0021435 A1 | * | 1/2005 | Hakanoglu et al. ......... 705/36 |
| 2005/0075959 A1 | * | 4/2005 | Woodruff et al. .......... 705/35 |
| 2005/0075976 A1 | * | 4/2005 | Woodruff et al. .......... 705/40 |
| 2005/0102213 A1 | * | 5/2005 | Savasoglu et al. ......... 705/36 |

FOREIGN PATENT DOCUMENTS

| | | | |
|---|---|---|---|
| JP | 2001319062 A | * | 11/2001 |
| JP | 2002109220 A | * | 4/2002 |
| JP | 2005050345 A | * | 2/2005 |

OTHER PUBLICATIONS

Farr Lucy et al "Contingent Convertibles" Practical US/International Tax Strategies, Feb. 13, 2002, pp. 1-2.*

(Continued)

*Primary Examiner*—Narayanswamy Subramanian
(74) *Attorney, Agent, or Firm*—George T. Marcou; Kilpatrick Stockton LLP

(57) ABSTRACT

The present invention relates to a method and system for providing and/or offering mandatorily convertible securities with associated senior debt instruments. The mandatorily convertible securities can be preferred stock or a purchase contract with the mandatorily convertible securities converting into a predetermined number of units of an underlying security on a mandatory conversion date. The predetermined number of units of an underlying security is based on a market value of the underlying security on the conversion date.

10 Claims, 4 Drawing Sheets

OTHER PUBLICATIONS

Petersen, J., "Innovations in Tax-Exempt Instruments and Transactions", National Tax Journal, vol. 4, No. 4, pp. 11-28, Dec. 1991.

Mourell et al., "Convertible notes", Australian Business Law Review, vol. 21, No. 5, pp. 338-352, Oct. 1993.

Freeman et al., "Tax consequences of business and investment-driven uses of drivatives", Taxes, vol. 72, No. 12, pp. 947-994, Dec. 1994.

"Physicians Heal Themselves in the Capital Markets (Physician Practice Management Groups are one of investment banking's most active and profitable markets; physicians practices in the US generate about $200 billion in revenues)", Investment Dealers' Digest, vol. 63, No. 42, pp. 38+. Oct. 20, 1997.

"Raising debt at a cost below prevailing market rates", International Tax Review, pp. 21-40, Jun. 2000.

"AMG Mandatory Convertible Securities Yiels $223 Million Net Proceeds", Business Wire, p. 2421, Jan. 10, 2002.

Chang, J., "Major Chem Films Post Losses Across the Board in 4th Quarter", Chemical MArket Reporter, vol. 261, No. 5, pp. 1+, Feb. 4, 2002.

* cited by examiner

METHOD AND SYSTEM FOR PROVIDING MANDATORILY CONVERTIBLE SECURITIES WITH ASSOCIATED SENIOR DEBT INSTRUMENTS

PRIORITY

This application claims priority to U.S. Provisional Patent Application No. 60/464,974, filed Apr. 24, 2003, entitled, "METHOD AND SYSTEM FOR PROVIDING MANDATORILY CONVERTIBLE SECURITIES WITH ASSOCIATED SENIOR DEBT INSTRUMENTS," which is herein incorporated by reference in its entirety.

FIELD OF THE INVENTION

The present invention relates to the field of structured financial products. More particularly, the present invention relates to a method and system for offering mandatorily convertible securities, such as Dividend Enhanced Common Stock (DECS[SM]), with associated senior debt instruments, such as amortizing notes.

BACKGROUND

As known in the art, structured financial products are financial instruments that are issued and sold by business entities (e.g., corporations) to investors for capital-raising activities. Typically, structured financial products are particularly designed and created by investment institutions for the business entities to meet the specific capital-raising needs of such entities. In turn, investors purchase structured financial products, focusing on payoff patterns (i.e., capital appreciation and/or current income) of the products, to address their specific investment objectives. As referred herein, an investor can be an individual, a group of individuals, an organization, or a business entity.

One of the many structured financial products in existence today is mandatorily convertible securities. As understood in the art, a conventional mandatorily convertible security (also referred to as Equity DECS[SM], PRIDES, PEPS, MEDS, SAILS, PIES, or other names) is typically a preferred security issued by a business entity paying a cash distribution and a special feature, namely, an automatic or mandatory conversion into a certain predetermined number of units of an underlying security at a specified future time. The Equity DECS or DECS conversion feature typically works as follows: on the mandatory conversion date the DECS will convert into one share of common stock if the share price on such date is at or below the share price on the date the DECS was issued, however, if the share price on the mandatory conversion date is above the value of the share price on the date the DECS was issued, each DECS will convert into less than one share of common stock.

An investor sees the DECS as an attractive investment because he or she earns a higher income return on the DECS than he or she would receive as a common stockholder. However, in exchange for that enhanced income return, the investor gives up some participation in potential appreciation of the common stock (through the reduction of the number of shares into which the DECS is convertible). On the other hand, the business entity sees DECS as an attractive means of raising equity capital (from the credit rating agencies' perspective) while retaining a certain amount of potential appreciation in its common stock (through the delivery to the investor of fewer shares upon conversion if the stock has performed well). Moreover, the issuance of a DECS enables the business entity to raise capital by tapping a different pool of investors than those that would otherwise be purchasers of the business entity's common stock.

Because the conventional DECS is typically a preferred security, payments of cash distributions in respect of that security are deeply subordinated in the capital structure of the issuer in terms of its obligation to make such payments. As a result, investors typically demand a higher distribution (coupon) rate in return of the DECS (especially those from non-investment grade issuers) to compensate for greater risk stemming from the subordination of the DECS' distribution payment obligations to senior claims against the issuer. In certain circumstances, this subordination could discourage investors from purchasing DECS from a particular issuer altogether. As a result, the issuer may not attract the right pool of investors and/or command the requisite prices for their issued DECS. Also, for some issuers, another drawback is the accounting presentation of the DECS. Even though the instrument mandatorily converts into common stock at maturity, the payment obligations associated with the instrument would require classification of the DECS as a liability, rather than as equity. For issuers who desire to increase the amount of equity on their balance sheets for accounting purposes (as well as raise capital that is viewed as equity from the perspective of the credit rating agencies), this presents a problem.

Hence, there exists a need for a system and method for offering a structured financial product that provides all the benefits of a DECS, attracts investors to such product in spite of a less favorable credit rating of the product's issuer, enhances the issuer's pricing efficiency of the issued product, and, in some cases, enables the issuer to present the instrument as equity for accounting purposes.

SUMMARY

Accordingly, embodiments of the present invention provides a system and method for offering a structured financial product that can provide the benefits of a DECS, attracts investors to such product in spite of a less favorable credit rating of the product's issuer, enhances the issuer's pricing efficiency of the issued product, and, in some cases, enables the issuer to present the instrument as equity for accounting purposes.

Embodiments of the present invention provide a system and method for offering financial instruments comprising a mandatorily convertible security convertible into a predetermined number of units of an underlying security and a senior amortizing debt instrument providing one or more payments to a purchaser of the financial instrument. The mandatorily convertible security can be a preferred stock or a purchase contract. The mandatorily convertible security can be converted into a predetermined number of an underlying security prior to a mandatory conversion date or can be converted into a predetermined number of units of an underlying security based on the market value of the underlying security on the mandatory conversion date.

The predetermined number of units of the underlying security can be a maximum number of units of the underlying security when the market value is greater than or equal to a threshold appreciation price with the number of units of the underlying security being equal to an initial offering price of the financial instrument divided by the threshold appreciation price. The predetermined number of units of the underlying security can be a minimum number of units of the underlying security when the market value is less than or equal to a reference price with the number of units of the underlying security being equal to an initial offering price of the financial instrument divided by a reference price. The predetermined number of units of the underlying security can be based on a predetermined trading period ending on a trading day immediately preceding the mandatory conversion date when the market value is greater than a reference price but less than a threshold appreciation price.

In another embodiment of the present invention, the financial instrument can be separated into the mandatorily convertible security and the senior amortizing debt instrument after a closing date. In yet another embodiment of the present invention, the financial instrument can be formed by combining a separate mandatorily convertible security and a separate senior amortizing debt instrument.

Additional aspects and novel features of the invention will be set forth in part in the description that follows, and in part will become more apparent to those skilled in the art upon examination of the present disclosure.

BRIEF DESCRIPTION OF THE DRAWINGS

The preferred embodiments of the present invention are illustrated by way of example and not limited to the following figures.

DETAILED DESCRIPTION

Reference is now made in detail to embodiments of the present invention, some examples of which are illustrated in the accompanying drawings, in which like numerals indicate like elements, showing a method and system for providing and/or offering financial instruments comprising mandatorily convertible securities with associated senior debt instruments.

Figure 1:
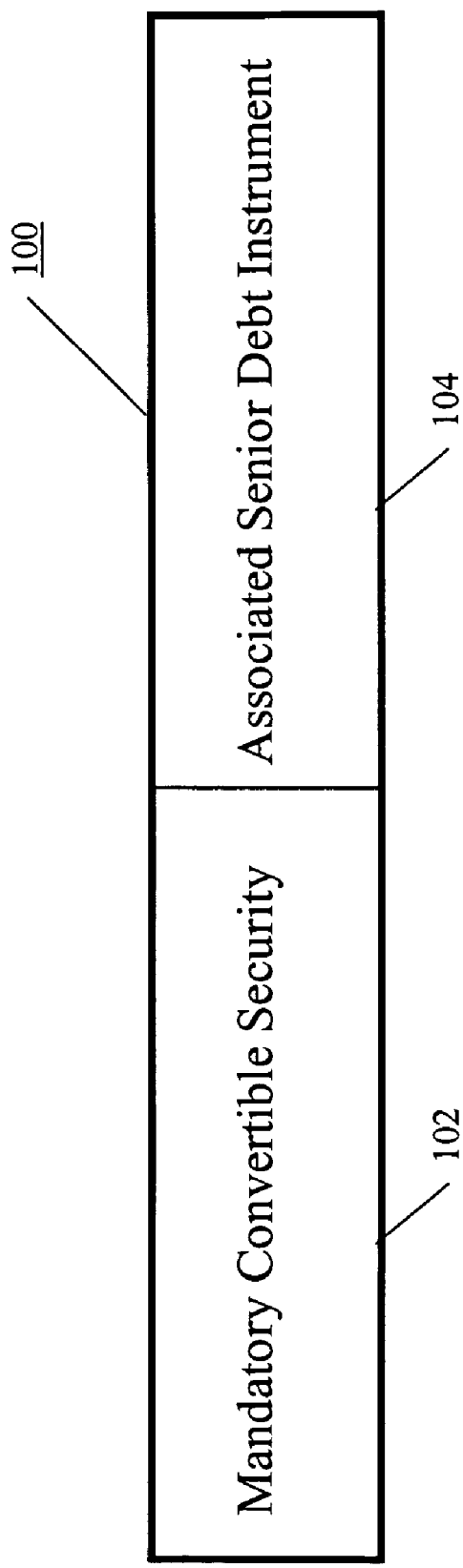
FIG. 1 depicts a financial instrument comprising a mandatorily convertible security with an associated senior debt instrument in accordance with a preferred embodiment of the present invention.
Figure 2:
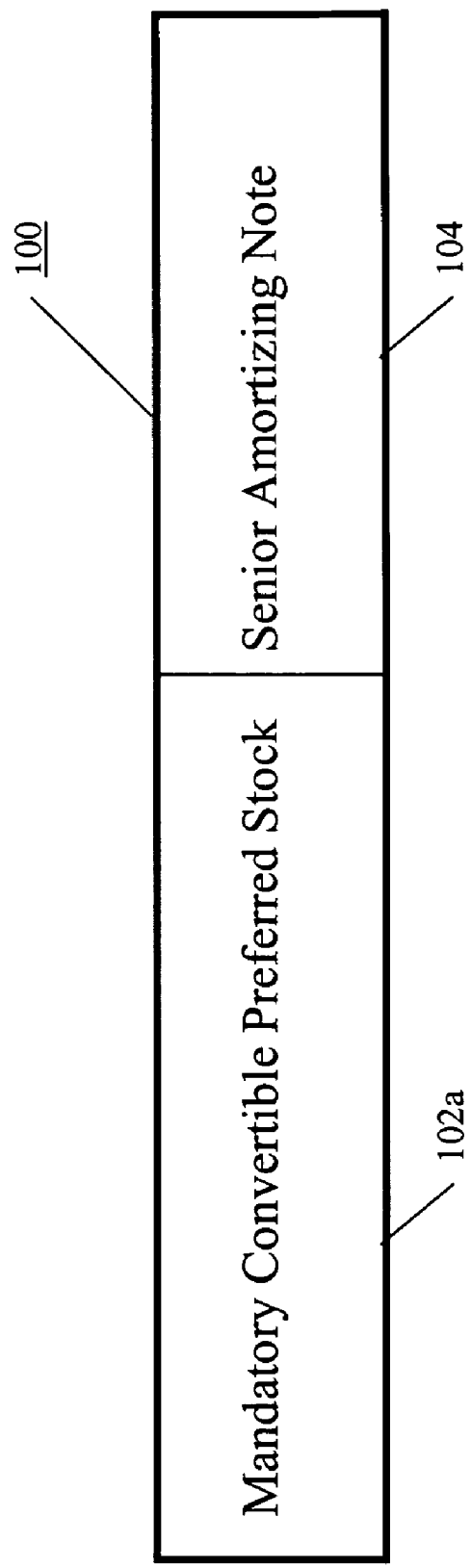
FIG. 2 depicts a financial instrument comprising a mandatory convertible preferred stock with an associated senior debt instrument in accordance with a preferred embodiment of the present invention.
Figure 3:
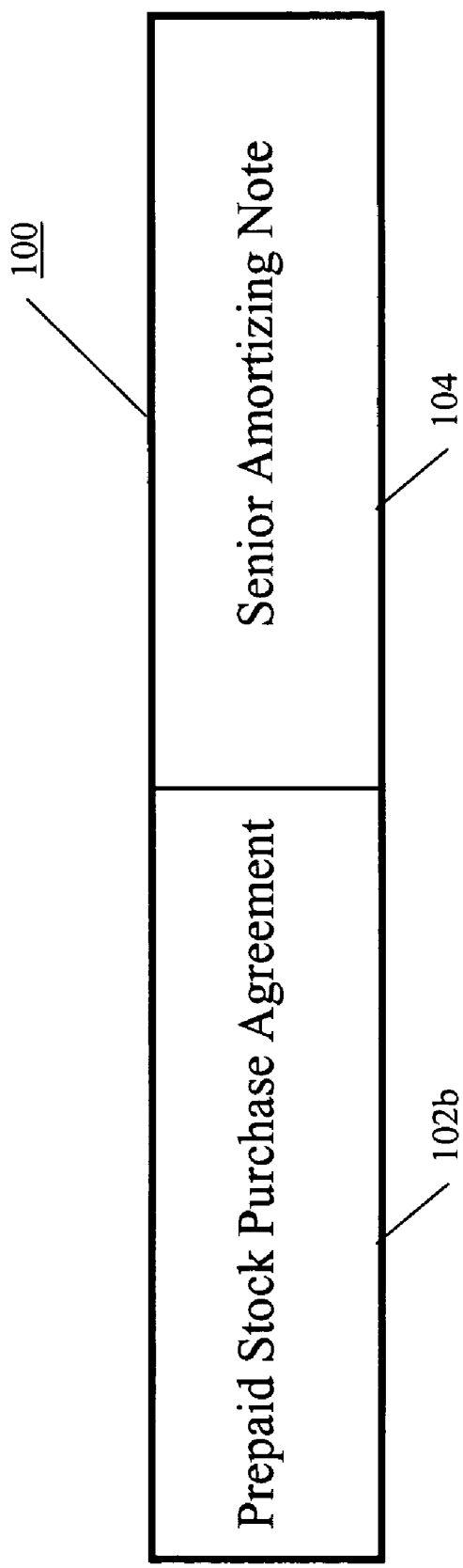
FIG. 3 depicts a financial instrument comprising a mandatory convertible purchase contract with an associated senior debt instrument in accordance with a preferred embodiment of the present invention.

Referring to FIG. 1, a financial instrument comprising a mandatorily convertible security and an associated senior debt instrument in accordance with a preferred embodiment of the present invention is illustrated. As shown, the financial instrument 100 comprises a mandatorily convertible security 102 and an associated senior debt instrument 104. The financial instrument 100 can be a modified Equity DECS or an amortizing bifurcated DECS ("AMBI-DECS"). The mandatorily convertible security 102 can be a mandatory convertible preferred stock 102a as illustrated in FIG. 2. Alternatively, the mandatorily convertible security 102 can be a prepaid stock purchase contract 102b as illustrated in FIG. 3. The associated senior debt instrument 104 can be, for example, a senior amortizing note, e.g., an "amortizing note."

Referring to FIG. 2, a financial instrument comprising a mandatory convertible preferred stock with an associated senior debt instrument in accordance with a preferred embodiment of the present invention is illustrated. As shown, the mandatorily convertible security 102, e.g., a modified Equity DECS, comprises a mandatory convertible preferred stock 102a, e.g., "preferred stock," and a senior amortizing note 104. As with traditional Equity DECS, the preferred stock 102a of the financial instrument 100 mandatorily converts into a predetermined number of units of an underlying security, based on the price of the underlying security on or about the mandatory conversion date. However, unlike the traditional Equity DECS, the preferred stock 102a of the financial instrument 100 does not pay distributions.

Referring to FIG. 3, a financial instrument comprising a mandatory convertible purchase contract with an associated senior debt instrument in accordance with a preferred embodiment of the present invention is illustrated. As shown, the financial instrument 100, e.g., an "AMBI-DECS", comprises a prepaid stock purchase contract 102b, e.g., a "purchase contract," and a senior amortizing note 104. As with traditional Equity DECS, the purchase contract 102b of the financial instrument 100 mandatorily converts into a predetermined number of units of an underlying security, based on the price of the underlying security on or about the mandatory conversion date. However, unlike the traditional Equity DECS, the purchase contract 102b of the financial instrument 100 does not pay distributions.

Referring to FIG. 1 again, on or about the mandatory conversion date, the mandatorily convertible security 102 automatically converts into a predetermined number of units of an underlying security based on the price of the underlying security. Thus, the mandatorily convertible security 102 does not pay distributions, rather the associated senior amortizing note 104 provides one or more payments to the holder of the financial instrument 100. Consequently, the overall return to an investor on the financial instrument 100 depends upon the return provided by each component 102, 104. In other words, the overall return includes the value of the unit(s) of the issuer's underlying security delivered upon conversion of the mandatorily convertible security 102 and the cash payments paid on the amortizing note 104. For example, the overall return depends on the value of the units of the underlying security delivered upon settlement of the preferred stock 102a (FIG. 2) or the settlement of the purchase contract 102b (FIG. 3), along with the cash payments paid on the amortizing note 104.

Hence, the financial instrument 100 uses bifurcation to separate the DECS payment stream from the mandatorily convertible securities 102 by using the amortizing note 104. The amortizing note 104 can be valued using a lower credit spread (lower cost to the issuer) than the distributions of a conventional Equity DECS due to the more senior claim status of the amortizing note 104. As a result, the issuer is able to sell the financial instrument 100 with a lower distribution rate (lower cost), and can appeal to a broader range of investors. The financial instrument 100 comprising the mandatorily convertible securities 102 and the amortizing note 104, can be offered to potential investors. The offer can include, inter alia, the issuer of the financial instrument 100, a number of financial instruments 100 being offered, an initial offering price of the financial instrument 100, a symbol of the underlying security on a stock exchange, a mandatory conversion or settlement date, a range of conversion or settlement rates, a threshold appreciation price, a reference price, an early conversion or settlement rate, an initial principal amount of each amortizing note, an installment payments, an installment payment dates, and other information as known in the art.

Figure 4:
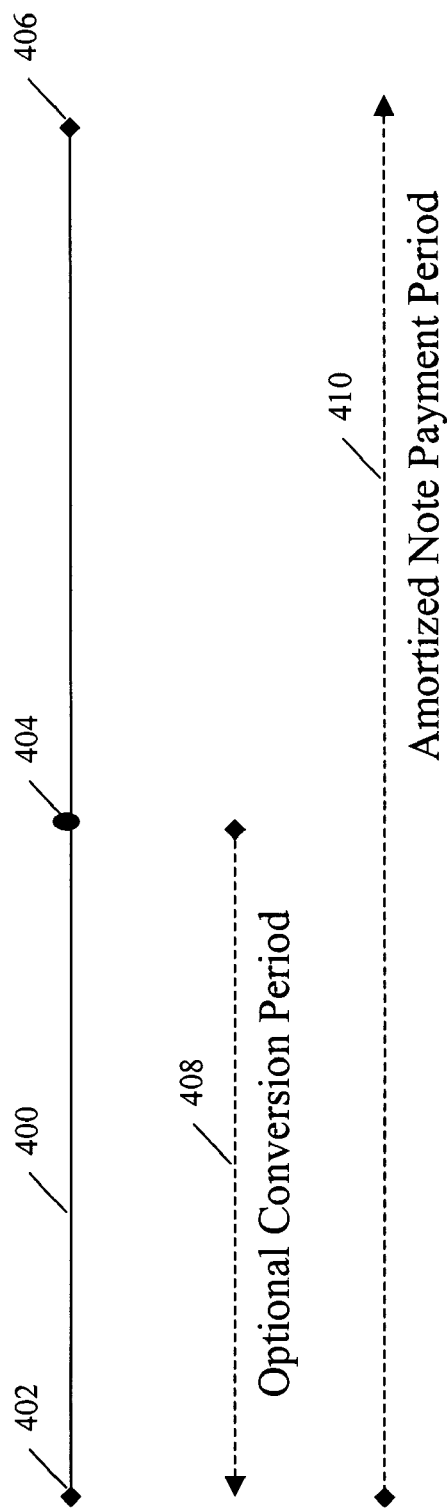
FIG. 4 depicts a timeline for various events associated with the financial instrument shown in FIG. 1 in accordance with a preferred embodiment of the present invention.

Referring to FIG. 4, a timeline for various events associated with the financial instrument shown in FIG. 1 in accordance with a preferred embodiment of the present invention is illustrated. The financial instruments 100 are issued prior to the mandatory conversion date 404, e.g., between the creation 402 of the financial instruments 100 and the mandatory conversion date 404. On or about the mandatory conversion date 404, each mandatorily convertible security 102 automatically converts into units of the underlying security, based on the applicable conversion rate. For example, each outstanding share of preferred stock (FIG. 2) or purchase contract (FIG. 3) is converted into units of the underlying security, e.g., shares of common stock.

The conversion rate for each mandatorily convertible security 102 cannot be more than a maximum number of units of the underlying security and not less than a minimum number of units of the underlying security, and is dependent on the applicable market value of underlying security on or about the mandatory conversion date 404. For example, if the applicable market value equals or exceeds a threshold appreciation price, the holder will receive a predetermined number of units of the underlying security per share of the preferred stock 102a or the purchase agreement 102b, e.g., a maximum. This rate can be calculated by dividing the financial instrument offering price by the threshold appreciation price, can be a set amount or can be determined using other calculation methods as known in the art. If the applicable market value is greater than a reference price, but less than the threshold appreciation price, the holder receives a predetermined number of units of the underlying security having an applicable market value. For example, the applicable market value can be based upon the predetermined trading period, e.g., twenty days, ending on the third trading day immediately preceding the mandatory conversion date. If the applicable market value is less than or equal to the reference price, the holder receives an applicable predetermined number of units of the underlying security per share of the preferred stock 102a or the purchase agreement 102b, e.g., a minimum. This rate is calculated by dividing the initial offering price by the reference price, can be a set amount or can be determined using other calculation methods as known in the art. This conversion rate is subject to adjustments as described below.

For illustrative purposes only, the following exemplary table shows the predetermined number of units of an underlying security issuable upon settlement of each share of the preferred stock 102a or the purchase contract 102b at the applicable market value, based on the reference price, e.g., $10, the threshold appreciation price, e.g., $12, and the assumed AMBI-DECS initial investment or par amount, e.g., $10. The threshold appreciation price can represent an appreciation of a set percentage above the reference price, e.g., twenty percent (20%). The exemplary table assumes that there will be no adjustments to the conversion rate described below and that holders do not elect to settle early. A holder of the preferred stock 102a or purchase contract 102b can receive on or about the mandatory conversion date 404 a predetermined number of units of the underlying security at the following assumed applicable market values:

| Assumed Applicable Market Value | Number of Units of the Underlying Security |
|---|---|
| $9.00 | 1.000 |
| $9.50 | 1.000 |
| $10.00 | 1.000 |
| $10.50 | 0.952 |
| $11.00 | 0.910 |
| $11.50 | 0.870 |
| $12.00 | 0.833 |
| $12.50 | 0.833 |
| 13.00 | 0.833 |

As the above exemplary table illustrates, if on or about the mandatory conversion date 404, the applicable market value is greater than or equal to the threshold appreciation price, the holder can receive a predetermined number of units of the underlying security for each preferred stock 102a or purchase contract 102b, e.g., 0.833 units of the underlying security. If on or about the mandatory conversion date 404, the applicable market value is less than the threshold appreciation price but greater than the reference price, the holder can receive a predetermined number of units of the underlying security having a value, assuming the applicable market value is equal to the actual market value of the underlying security on or about the mandatory conversion date 404 and the issuer could retain all appreciation in the market value of the underlying security. If on or about the mandatory conversion date, the applicable market value is less than or equal to the reference price, the holder can receive a predetermined number of units of the underlying security for each preferred stock 102a or purchase contract 102b, e.g., 1.000 units of the underlying security. As a result, the holder can realize the entire loss on the decline in market value of the underlying security for the preferred stock 102a or purchase contract 102b for that period. In other words, between the reference price ($10) and the threshold appreciation price ($12), the DECS convert into enough shares to return to the investor the value of his or her initial investment ($10).

Referring to FIG. 4 again, during the optional conversion period 408, e.g., between the creation 402 of the financial instruments 100 and the mandatory conversion date 404, the owner can convert the mandatorily convertible security 102 into units of the underlying security. The optional conversion can result in the conversion of the mandatorily convertible security 102 into a predetermined number of units of the underlying security, which can be a minimum number of units deliverable pursuant to the mandatory conversion rate, subject to the adjustment as described below. That is, the market value of the underlying security on the optional conversion date does not affect the optional conversion rate. The owner's right to convert a share of the mandatorily convertible interest 102 into units of the underlying security prior to the mandatory conversion date 404 can be subject to the delivery of the mandatorily convertible security 102. In other embodiments, optional conversion rates as known in the art can be used.

In a preferred embodiment, prior to the mandatory conversion date 404, if the issuer is involved in a merger in which a set percentage, e.g., at least thirty percent, of the consideration for the underlying security consists of cash or cash equivalents then on or after the date of the cash merger, each holder of a mandatorily convertible security 102 can convert the mandatorily convertible security 102 at the applicable conversion rate calculated immediately prior to the cash merger based on the applicable market value.

In a preferred embodiment, prior to the mandatory conversion date 404, each financial instrument 100 can be separated into its mandatorily convertible security 102, e.g., preferred stock 102a or purchase contract 102b, and amortized note 104 on or after a set date, e.g., after the creation date 402. Optional conversion of the mandatorily convertible security 102 can occur during the optional conversion period 408, e.g., between the creation date 402 and the mandatory conversion date 404. Conversely, a holder having a separate mandatorily convertible security 102 and a separate amortized note 104, can combine them into a financial instrument 100.

Referring to FIG. 4 again, on or after the mandatory conversion date 404 the amortized note 104 provides one or more payments to the holder of the financial instrument 100. In the preferred embodiment, the payments are broken into multiple payments which can be paid in equal amounts in quarterly installments. The payments are paid during the amortized note payment period 410, e.g., between the creation date and the end date, e.g., the right endpoint 406 of the timeline 400. The amount to be paid, which in the aggregate can be equivalent to a fixed percentage cash distribution per year on the initial offering price per financial instrument 100. Each amortizing note 104 can have an initial principal amount and bear interest at a given rate per annum. Each installment payment can constitute a partial repayment of principal and a payment of interest, computed at a rate of set percentage per year. For example, the interest can be calculated on the basis of a 360-day year consisting of twelve thirty-day months. Thus, the return on investment for the financial instrument 100 depends upon the return provided by each component 102, 104. The amortizing notes 104 can be direct, unsecured and unsubordinated obligations, ranking equal in right of payment with all of the other unsecured and unsubordinated obligations. The indenture and the supplemental indentures under which amortizing notes can be issued contain no restrictions on the amount of additional indebtedness which may occur.

The formula for determining the mandatory conversion rate or any optional conversion rate can be adjusted if certain events occur, e.g., if (a) the payment of dividends and other distributions on the underlying security; (b) the issuance to all holders of the underlying security of rights, warrants or options, other than pursuant to dividend reinvestment or share purchase or similar plans, entitling them, for a period of up to forty-five days, to subscribe for or purchase the underlying security at less than the current market price of the underlying security; (c) subdivisions, splits or combinations of the underlying security; (d) distributions to all holders of the underlying security of evidences of indebtedness, shares of capital stock, securities, cash or property, excluding any dividend or distribution covered by the (a) and (b) above and any dividend or distribution paid exclusively in cash; (e) distributions consisting exclusively of cash to all holders of the underlying security in an aggregate amount that, when combined with (i) other all-cash distributions made within the preceding twelve months and (ii) the cash and the fair market value, as of the date of expiration of the tender or exchange offer, of the consideration paid in respect of any tender or exchange offer by us or any of the subsidiaries for the underlying security concluded within the preceding twelve months (excluding any such all-cash distributions and tender or exchange offers in respect of which prior anti-dilution adjustments have been made), exceeds a given percentage of the aggregate market capitalization (such aggregate market capitalization being the product of the current market price of the underlying security multiplied by the predetermined number of units of the underlying security then outstanding) on the date fixed for the determination of stockholders entitled to receive such distribution; or (f) the successful completion of a tender or exchange offer made by the issuer or any of the subsidiaries for the underlying security that involves an aggregate consideration having a fair market value that, when combined with (i) any cash and the fair market value of other consideration payable in respect of any tender or exchange offer by the issuer or any of the subsidiaries for the underlying security concluded within the preceding twelve months and (ii) aggregate amount of any all-cash distributions to all holders of the underlying security made within the preceding twelve months (excluding any such all-cash distributions and tender or exchange offers in respect of which prior anti-dilution adjustments have been made), exceeds a given percentage of the aggregate market capitalization on the expiration of such tender or exchange offer.

In the case of certain reclassifications, consolidations, mergers, sales or transfers of assets or other transactions pursuant to which units of the underlying security can be convened into the right to receive other securities, cash or property (collectively, "reorganization events"), each share of preferred stock then outstanding can become, without the consent of the holder of such share of preferred stock, a right to receive only the kind and amount of securities, cash and other property receivable upon consummation of the reorganization event by a holder of the units of the underlying security prior to the closing date of the reorganization event. The amount of such securities, cash and other property receivable upon mandatory or optional conversion after the consummation of the reorganization event can be based on the value on the relevant conversion date of the exchange property. The "exchange property" means the hypothetical amount of such securities, cash and other property that can be received upon consummation of the reorganization event in exchange for the maximum predetermined number of units of an underlying security deliverable at the mandatory conversion rate immediately prior to the closing date of the reorganization event.

The actual amount of exchange property receivable upon mandatory conversion can be that variable amount based upon the mandatory conversion rate and the applicable market value of the exchange properly at such time. The actual amount of exchange property receivable upon optional conversion can be determined in accordance with the procedures for the "optional conversion" using the conversion rate that results in the minimum amount of exchange property being delivered pursuant to optional conversion.

If an adjustment is made to the mandatory conversion rate, an adjustment can be made to the applicable market value to determine which mandatory conversion rate can be applicable on or about the mandatory conversion date. Each adjustment to the mandatory conversion rate can result in a corresponding adjustment to the number of units of the underlying security issuable upon the optional conversion of a share of preferred stock as described with the optional conversion.

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

What is claimed is:

1. A method for performing a financial transaction comprising:

issuing a financial instrument, the financial instrument comprising:

a mandatorily convertible security convertible into one of a predetermined number of shares of an underlying security based on a conversion rate and an applicable market value of the underlying security on a mandatory conversion date and a minimum predetermined number of shares of the underlying security on an optional conversion date prior to the mandatory conversion date; and a senior amortizing note providing one or more payments to a holder of the financial instrument;

converting the mandatorily convertible security and issuing shares of the underlying security on one of the optional conversion date and mandatory conversion date; and making at least one payment to the holder of the financial instrument, wherein the at least one payment is based solely on the senior amortizing notes.

2. The method of claim 1 wherein the mandatorily convertible security is a preferred stock.

3. The method of claim 1 wherein the mandatorily convertible security is a purchase contract.

4. The method of claim 1 further comprising setting the predetermined number of shares of the underlying security prior to the issuance of the financial instrument.

5. The method of claim 1 further comprising setting the predetermined number of shares of the underlying security based on a market value of the underlying security on a mandatory conversion date.

6. The method of claim 5 wherein the predetermined number of shares of the underlying security is based on a maximum predetermined number of shares of the underlying security when the market value is at least equal to or greater than a threshold appreciation price with the number of shares being equal to an initial offering price of the financial instrument divided by a threshold appreciation price.

7. The method of claim 5 wherein the predetermined number of shares of the underlying security is based on a minimum predetermined number of shares of the underlying security when the market value is at least equal to or less than a reference price with the number of shares being equal to an initial offering price of the financial instrument divided by a reference price.

8. The method of claim 5 wherein the predetermined number of shares of the underlying security has a value based on a predetermined trading period ending on a trading day immediately preceding a mandatory conversion date when the market value is greater than a reference price and less than a threshold appreciation price.

9. The method of claim 1 further comprising separating the financial instrument into the mandatorily convertible security and the senior amortizing note after a closing date.

10. The method of claim 1 further comprising forming the financial instrument by combining a separate mandatorily convertible security and a separate senior amortizing note.

* * * * *

UNITED STATES PATENT AND TRADEMARK OFFICE
CERTIFICATE OF CORRECTION

PATENT NO.         : 7,257,556 B1
APPLICATION NO. : 10/830308
DATED                  : August 14, 2007
INVENTOR(S)       : Alan Rifkin It is certified that error appears in the above-identified patent and that said Letters Patent is hereby corrected as shown below:

Title Page
IN THE REFERENCE CITED (56) SECTION -

In Page 2, Column 2, Line 5 under "Other Publications," please change ""AMG Mandatory Convertible Securities Yiels $223 Million Net" to -- "AMG Mandatory Convertible Securities Yields $223 Million Net --

In Page 2, Column 2, Line 7 under "Other Publications," please change "Chang, J., "Major Chem Films Post Losses Across the Board in $4^{th}$" to -- Chang, J., "Major Chem Firms Post Losses Across the Board in $4^{th}$ --

Signed and Sealed this

Thirteenth Day of November, 2007

JON W. DUDAS
*Director of the United States Patent and Trademark Office*